US012090801B2

(12) United States Patent
Nesbitt (10) Patent No.: US 12,090,801 B2
(45) Date of Patent: Sep. 17, 2024

(54) NON-PNEUMATIC TIRE HAVING REINFORCED OUTER RING

(71) Applicant: Bridgestone Americas Tire Operations, LLC, Nashville, TN (US)

(72) Inventor: Adam K. Nesbitt, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 278 days.

(21) Appl. No.: 17/297,537

(22) PCT Filed: Dec. 17, 2019

(86) PCT No.: PCT/US2019/066828
§ 371 (c)(1),
(2) Date: May 27, 2021

(87) PCT Pub. No.: WO2020/139623
PCT Pub. Date: Jul. 2, 2020

(65) Prior Publication Data
US 2022/0041015 A1    Feb. 10, 2022

Related U.S. Application Data

(60) Provisional application No. 62/785,792, filed on Dec. 28, 2018.

(51) Int. Cl.
*B60C 7/22*      (2006.01)
*B29D 30/02*   (2006.01)
(Continued)

(52) U.S. Cl.
CPC ............... *B60C 7/22* (2013.01); *B29D 30/02* (2013.01); *B60C 7/146* (2021.08); *B60C 7/18* (2013.01); *B60C 9/2006* (2013.01)

(58) Field of Classification Search
CPC .. B60C 7/22; B60C 7/146; B60C 7/18; B60C 9/2006; B60C 7/102; B60C 7/143; B60C 7/14; B29D 30/02
See application file for complete search history.

(56) References Cited

U.S. PATENT DOCUMENTS 4,235,270 A    11/1980    Kahaner et al.
4,514,243 A     4/1985    Moore, III et al.
(Continued)

FOREIGN PATENT DOCUMENTS

EP      0622251       7/1997
JP    2002331806    11/2002
(Continued)

OTHER PUBLICATIONS

European Search Report; Corresponding European Application No. 19906197; Sep. 19, 2022.
(Continued)

*Primary Examiner* — Emmanuel S Luk
*Assistant Examiner* — Elisa H Vera
(74) *Attorney, Agent, or Firm* — Shaun J. Fox; Bryan J. Jaketic (57) ABSTRACT

A non-pneumatic tire includes an inner ring having an axis of rotation and an outer ring having a plurality of circumferential reinforcements. The non-pneumatic tire further includes support structure extending from the inner ring to the outer ring. The non-pneumatic tire also includes a circumferential tread extending about the outer ring. The circumferential tread includes a tread reinforcement layer spaced from a bottom of the circumferential tread.

20 Claims, 8 Drawing Sheets

(51) Int. Cl.
*B60C 7/14* (2006.01)
*B60C 7/18* (2006.01)
*B60C 9/20* (2006.01)

(56) References Cited

U.S. PATENT DOCUMENTS

| | | | |
|---|---|---|---|
| 6,303,060 B1* | 10/2001 | Lobo | B29C 44/1271 |
| | | | 264/261 |
| 6,640,859 B1 | 11/2003 | Laurent et al. | |
| 8,931,531 B2 | 1/2015 | Kubek et al. | |
| 2002/0037409 A1* | 3/2002 | Tunis | B29C 70/088 |
| | | | 428/375 |
| 2004/0256044 A1* | 12/2004 | Riva | D07B 1/0646 |
| | | | 152/531 |
| 2010/0200131 A1 | 8/2010 | Masanori et al. | |
| 2011/0253279 A1* | 10/2011 | Daghini | D07B 1/0613 |
| | | | 152/526 |
| 2015/0129101 A1 | 5/2015 | Koide et al. | |
| 2015/0360509 A1* | 12/2015 | Werner | B60B 5/02 |
| | | | 264/103 |
| 2016/0257170 A1 | 9/2016 | Sugiya et al. | |
| 2016/0339745 A1* | 11/2016 | Asper | B60B 9/12 |
| 2017/0057294 A1* | 3/2017 | Iwamura | B60C 11/0041 |
| 2018/0043647 A1* | 2/2018 | Gaut | B29D 30/02 |
| 2018/0056720 A1 | 3/2018 | Abe | |
| 2018/0086142 A1 | 3/2018 | Hasegawa et al. | |
| 2018/0170109 A1 | 6/2018 | Delefino | |
| 2018/0289173 A1* | 10/2018 | Westing | B29C 70/521 |

FOREIGN PATENT DOCUMENTS

| | | |
|---|---|---|
| JP | 2004224117 | 8/2004 |
| JP | 2008044445 | 2/2008 |
| JP | 2009269410 | 11/2009 |
| JP | 2009286208 | 12/2009 |
| JP | 2011178308 | 9/2011 |
| JP | 2011219009 | 11/2011 |
| JP | 2013032072 | 2/2013 |
| JP | 2013039922 | 2/2013 |
| JP | 2016179731 | 10/2016 |
| JP | 2018027775 | 2/2018 |
| WO | 2014188912 | 11/2014 |

OTHER PUBLICATIONS

Jaehyung Ju et al., Rolling Resistance of a Non-Pneumatic Tire Having a Porous Elastomer Composite Shear Band; Tire Science and Technology; Jul. 2013.

International Search Report & Written Opinion; Corresponding PCT Application No. PCT/US2019/066828; Authorized Officer Chan Yoon HWANG; Apr. 23, 2020.

* cited by examiner

NON-PNEUMATIC TIRE HAVING REINFORCED OUTER RING

FIELD OF INVENTION

The present disclosure relates to a non-pneumatic tire, and a method of making the same. More particularly, the present disclosure relates to a reinforced outer ring for a support structure of a non-pneumatic tire and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring. In some non-pneumatic tires, a circumferential tread may be wrapped about the outer ring of the tire. The circumferential tread may contain a shear element having an elastic region disposed between upper and lower inelastic regions.

SUMMARY OF THE INVENTION

In one embodiment, a non-pneumatic tire includes an inner ring having an axis of rotation and an outer ring having a plurality of circumferential reinforcements. The non-pneumatic tire further includes support structure extending from the inner ring to the outer ring. The non-pneumatic tire also includes a circumferential tread extending about the outer ring. The circumferential tread includes a tread reinforcement layer spaced from a bottom of the circumferential tread.

In another embodiment, a method of making a non-pneumatic tire includes providing a tire structure having an inner ring, an outer ring, and a plurality of support structures extending between the inner ring and the outer ring. The method further includes providing a thermoplastic sheet having reinforcement cords embedded therein, and attaching the thermoplastic sheet to the outer ring of the tire structure. The method also includes forming a circumferential tread having a reinforcement layer spaced from a bottom surface, and attaching the circumferential tread to the thermoplastic sheet.

In yet another embodiment, a shear structure for a non-pneumatic tire includes a thermoplastic hoop having reinforcement cords embedded therein. The shear structure also includes a first layer of elastomeric material disposed about the thermoplastic hoop, a reinforcement layer disposed about the first layer of elastomeric material, and a second layer of elastomeric material disposed about the reinforcement layer.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
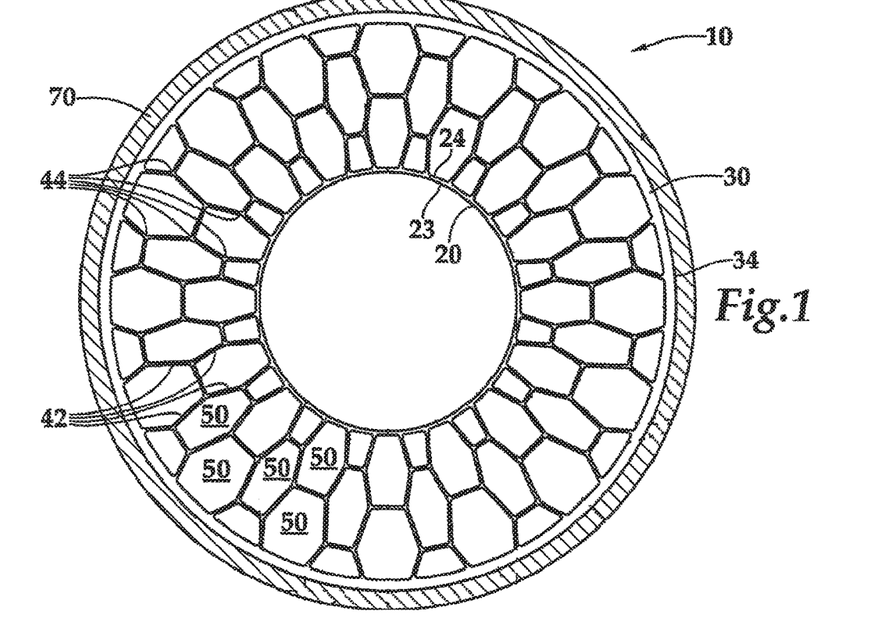
FIG. 1 is a front view of an undeformed non-pneumatic tire.
Figure 2:
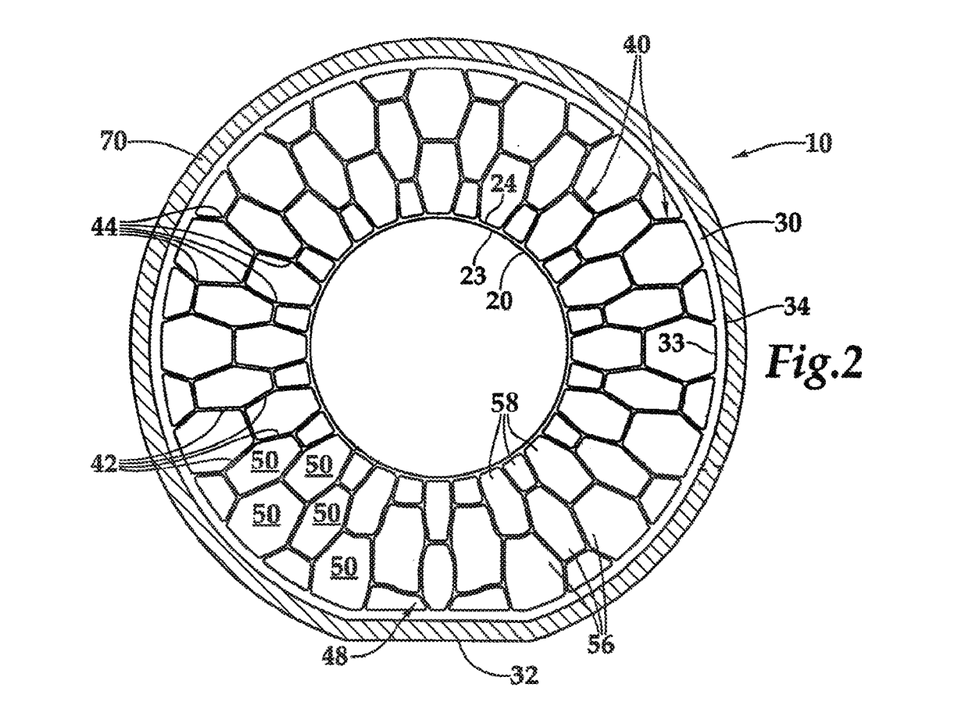
FIG. 2 is a front view of the non-pneumatic tire of FIG. 1 being deformed when subjected to a load.

FIGS. 1 and 2 illustrate one embodiment of a non-pneumatic tire 10. The non-pneumatic tire 10 is merely an exemplary illustration and is not intended to be limiting. In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of an elastomeric material or metal.

The non-pneumatic tire 10 further includes a generally annular outer ring 30 surrounding an interconnected web 40, which is a support structure connected to the generally annular inner ring 20. In alternative embodiments, a plurality of spokes or other support structure connects the inner ring to the outer ring. The outer ring 30 can be configured to deform in an area 48 around and including a footprint region 32 (see FIG. 2), which decreases vibration and increases ride comfort.

In one embodiment, the generally annular inner ring 20 and the generally annular outer ring 30 are made of the same material as interconnected web 40. In an alternative embodiment, at least one of the generally annular inner ring, the generally annular outer ring, and the interconnected web are made of a different material. As shown in FIG. 1, the generally annular outer ring 30 can have a radially external surface 34 to which a tread carrying layer 70 is attached. Attachment can be done adhesively or using other methods commonly available in the art.

In the illustrated embodiment, the interconnected web 40 has at least two radially adjacent layers 56, 58 of web elements 42 that define a plurality of generally polygonal openings 50. In other embodiments (not shown), other web configurations may be employed. In another embodiment (not shown), spokes or other support structure may be employed instead of a web.

Figure 3:
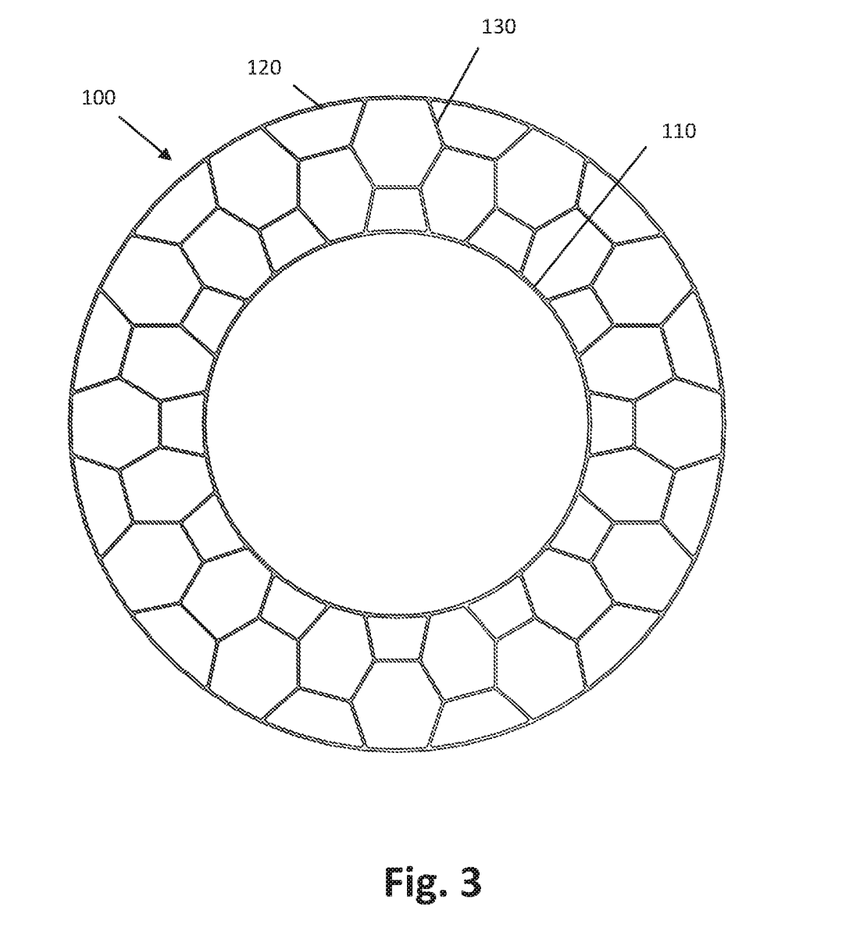
FIG. 3 is a front view of an alternative embodiment of a tire structure for a non-pneumatic tire.

FIG. 3 illustrates a front view of another embodiment of a tire structure 100 for a non-pneumatic tire. The tire structure 100 has a generally annular inner ring 110, a generally annular outer ring 120, and support structure in the form of an interconnected web extending between the inner ring 110 and the outer ring 120. The interconnected web is formed by a plurality of web elements 130 that define polygonal openings. In this particular embodiment, the web elements 130 form a plurality of hexagonal and substantially trapezoidal shapes, including an outer series of alternating hexagonal and trapezoidal opening and an inner series of alternating hexagonal and trapezoidal openings.

Figure 4:
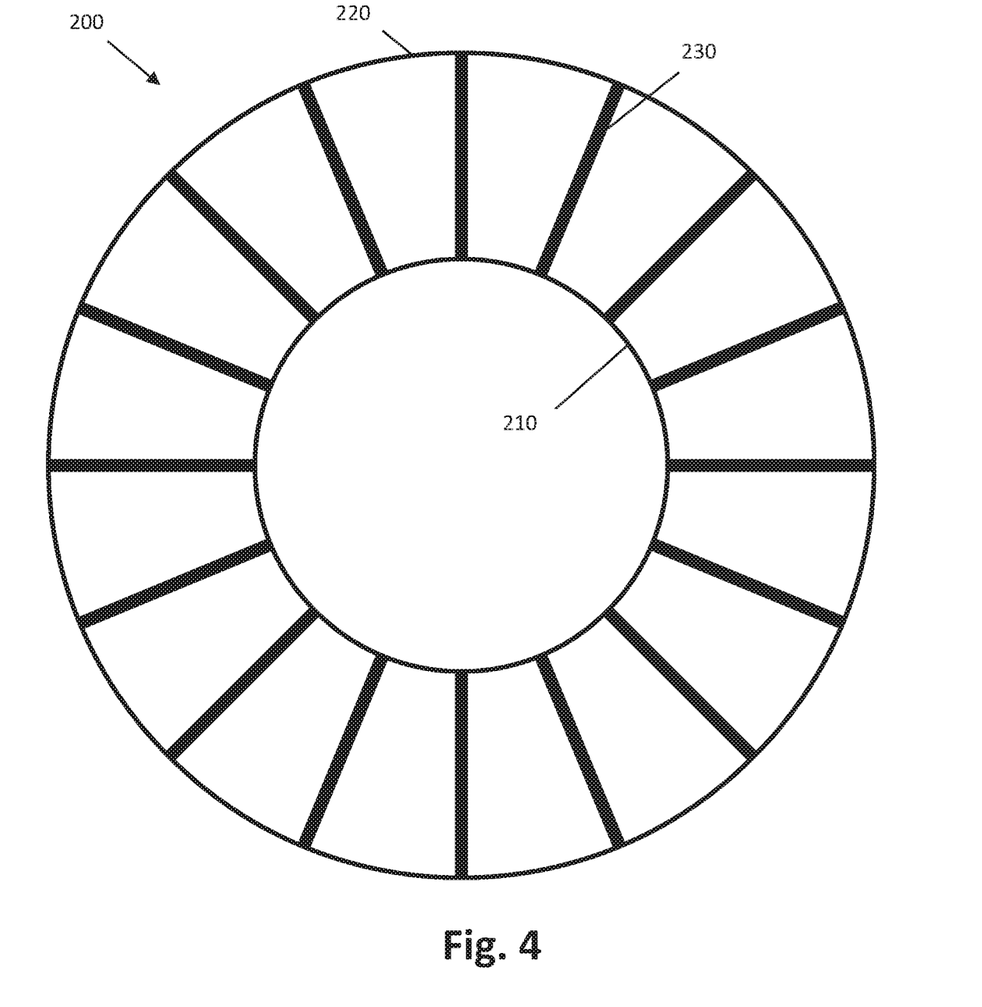
FIG. 4 is a front view of another alternative embodiment of a tire structure for a non-pneumatic tire.

FIG. 4 is a front view of another alternative embodiment of a tire structure 200 for a non-pneumatic tire. The tire structure 200 has a generally annular inner ring 210, a generally annular outer ring 220, and support structure in the form of spokes 230 extending between the inner ring 210 and the outer ring 220. In the illustrated embodiment, 16 radially extending, linear spokes are shown. However, it should be understood that any number of spokes may be employed in any geometry and orientation. It should be understood that the geometries shown in FIGS. 1-4 are merely exemplary and that any geometries may be employed.

Figure 5A:
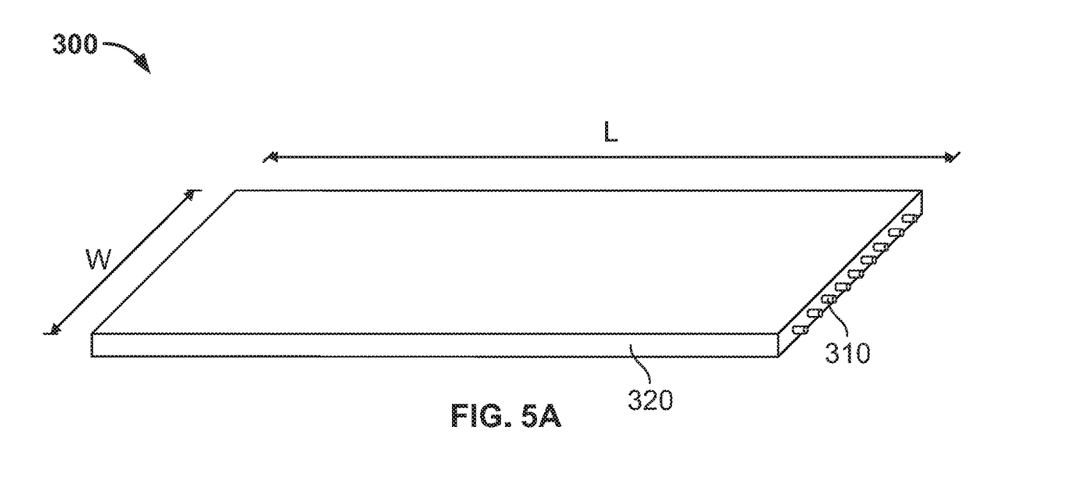
FIG. 5A is a schematic drawing illustrating a perspective view of one embodiment of a reinforced sheet.

FIG. 5A is a schematic drawing illustrating a perspective view of one embodiment of a reinforced sheet 300. The reinforced sheet 300 has a length L in a longitudinal direction, and a width W in a lateral direction. The length L is greater than the width W. Thus, the sheet 300 may be referred to as an elongated sheet.

In one embodiment, the reinforced sheet 300 includes reinforcement cords 310 extending in a longitudinal direction, and which are embedded in a thermoplastic material 320. The reinforcement cords 310 are constructed of a high strength material. Exemplary materials for reinforcement cords 310 include, without limitation, polyester, nylon, aramid, glass, steel, and other metal. In one specific embodiment, the thermoplastic material 320 is a thermoplastic elastomer resin. An exemplary thermoplastic elastomer resin is commercially sold under the brand name HYTREL by DUPONT. However, it should be understood that any thermoplastic elastomer resin may be employed. Thermoplastic elastomer resins exhibit desirable resilience, heat and chemical resistance, strength, and durability. However, other polymeric materials may be selected to embed the reinforcement cords if different properties are desired.

The reinforced cords 310 may be embedded in the thermoplastic material 320 through pultrusion, co-extrusion, or other means of cord coating. The resulting reinforced sheet 300 would be flexible due to thin gauge and low modulus.

Figure 5B:
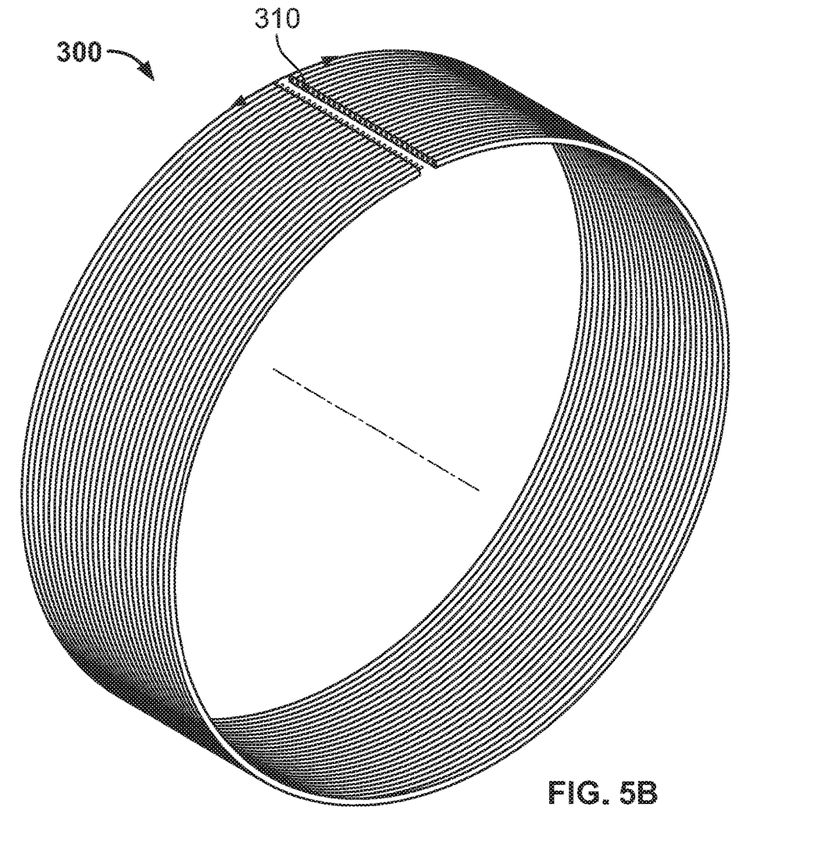
FIG. 5B is a perspective view of the reinforced sheet formed into a hoop.

FIG. 5B is a perspective view of the reinforced sheet 300 formed into a hoop. The reinforced sheet 300 is bent such that the reinforcement cords 310 extend in a circumferential direction. In an alternative embodiment (not shown), the reinforced sheet may be cut at an angle and the hoop formed such that the reinforcement cords extend at an acute angle with respect to the circumferential direction. After the hoop is formed, the ends of the reinforced sheet 300 are joined together. The ends may be joined with an adhesive, or by welding or brazing.

Figure 6:
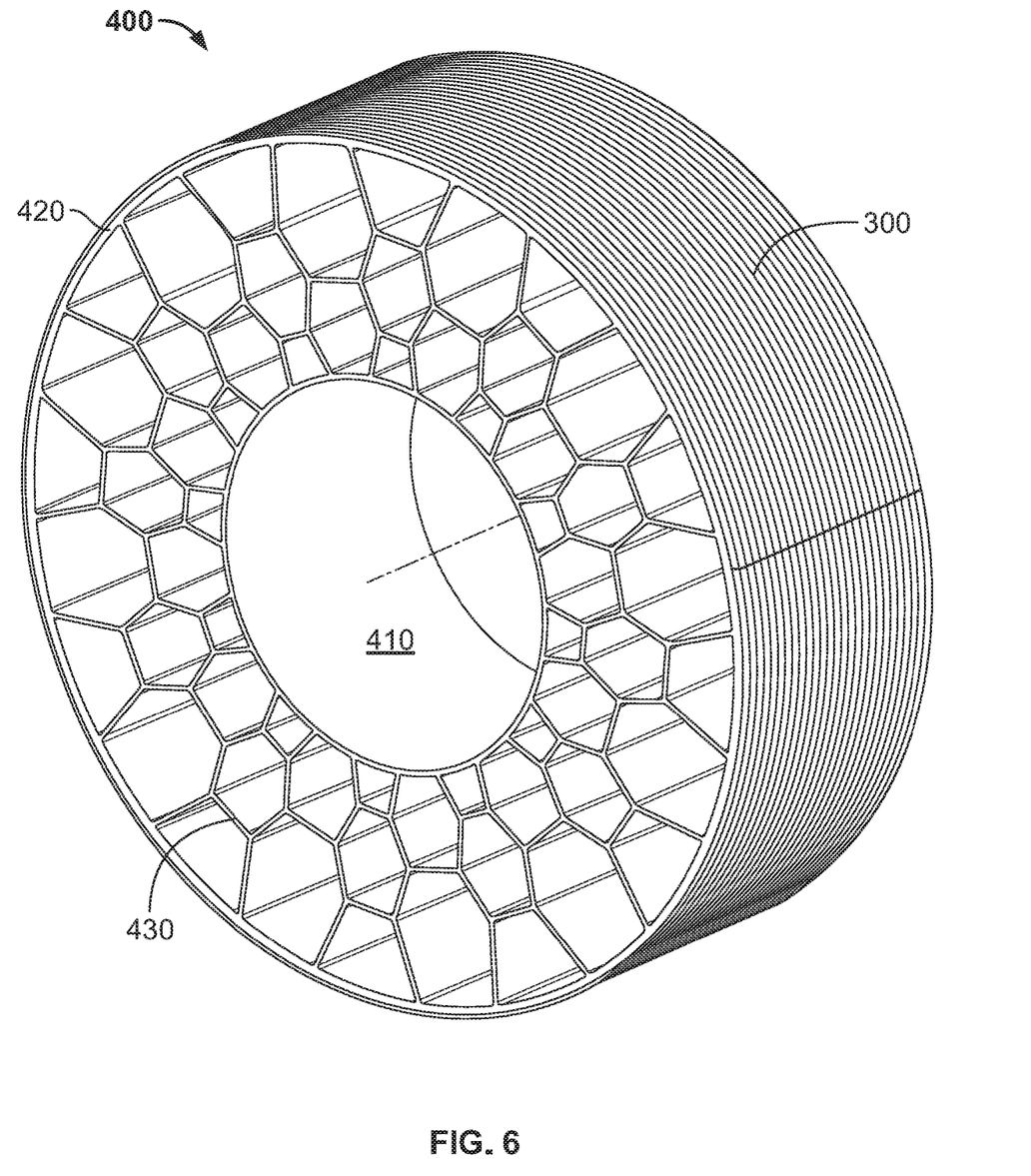
FIG. 6 is a perspective view of the reinforced sheet disposed on a tire structure for a non-pneumatic tire.

FIG. 6 is a perspective view of the reinforced sheet 300 disposed on a tire structure 400 for a non-pneumatic tire. The tire structure 400 has an inner ring 410 having an axis of rotation, a generally annular outer ring 420, and support structure in the form of an interconnected web extending between the inner ring 410 and the outer ring 420. The interconnected web is formed by a plurality of web elements 430 that define polygonal openings. In this particular embodiment, the web elements 430 form a plurality of hexagonal and substantially trapezoidal shapes. In one embodiment, the inner ring 410, outer ring 420, and support structure 430 are constructed of the same material. In alternative embodiments, different materials may be employed. The tire structure 400 is merely exemplary, and it should be understood that the reinforced sheet 300 may be disposed about any non-pneumatic tire structure, including structures having webbing and structures having spokes.

The reinforced sheet 300 is attached to the outer ring 420. In the illustrated embodiment, the reinforced sheet 300 is first formed into a hoop in the manner described above. The width of the hoop is substantially the same as the width of the outer ring 420. In one embodiment, the hoop is attached to the outer ring 420 by spin welding the hoop to the outer ring 420. Spin welding is a friction welding technique used on thermoplastic materials, in which the parts to be welded are heated by friction. The heat may be generated by turning the hoop and holding the tire structure 400 stationary against the hoop, or by turning the tire structure 400 and holding the hoop stationary against the tire structure 400. This is continued until the heat of friction between the parts reaches a sufficient level for the parts to weld. The stationary part is then released to spin as well, while pressure is applied along the axis of rotation, holding the parts together as they cool. Such a process may require the hoop to have a thickness that is greater than a predetermined minimum thickness. In alternative embodiments, the hoop is attached to the outer ring with an adhesive, by welding or brazing, or by a chemical bond, such as by heating the components to create a bond.

In an alternative embodiment, the reinforced sheet 300 is a ribbon having a width that is less than the width of the outer ring. In such an embodiment, the elongated sheet may have a greater initial width and the elongated sheet is cut into ribbons having a smaller width. Alternatively, the elongated sheet may be initially formed as a ribbon.

When the reinforced sheet 300 is formed as a ribbon, the step of attaching the reinforced sheet 300 to the outer ring 420 of the tire structure 400 includes spirally winding the ribbon about the outer ring 420 of the tire structure 400. The ribbon may be affixed to the outer ring 420 with an adhesive, by welding or brazing, or by a chemical bond, such as by heating the components to create a bond.

After the reinforced sheet 300 is attached to the outer ring 420, the reinforced sheet 300 may be described as being part of the outer ring 420. In other words, the outer ring 420 may be described as including a lower layer constructed of a first material and an upper layer constructed of a second material different from the first material, wherein the second material has the circumferential reinforcements embedded therein.

After the reinforced sheet 300 is attached to the outer ring, a circumferential tread is disposed about the reinforced sheet 300. Where the reinforced sheet 300 is described as being part of the outer ring 420, the circumferential tread may be described as being disposed about the outer ring 420. In one embodiment, the circumferential tread includes a tread reinforcement layer spaced from a bottom of the circumferential tread. Examples of circumferential treads disposed on reinforced sheets are shown in FIGS. 7-10.

Figure 7:
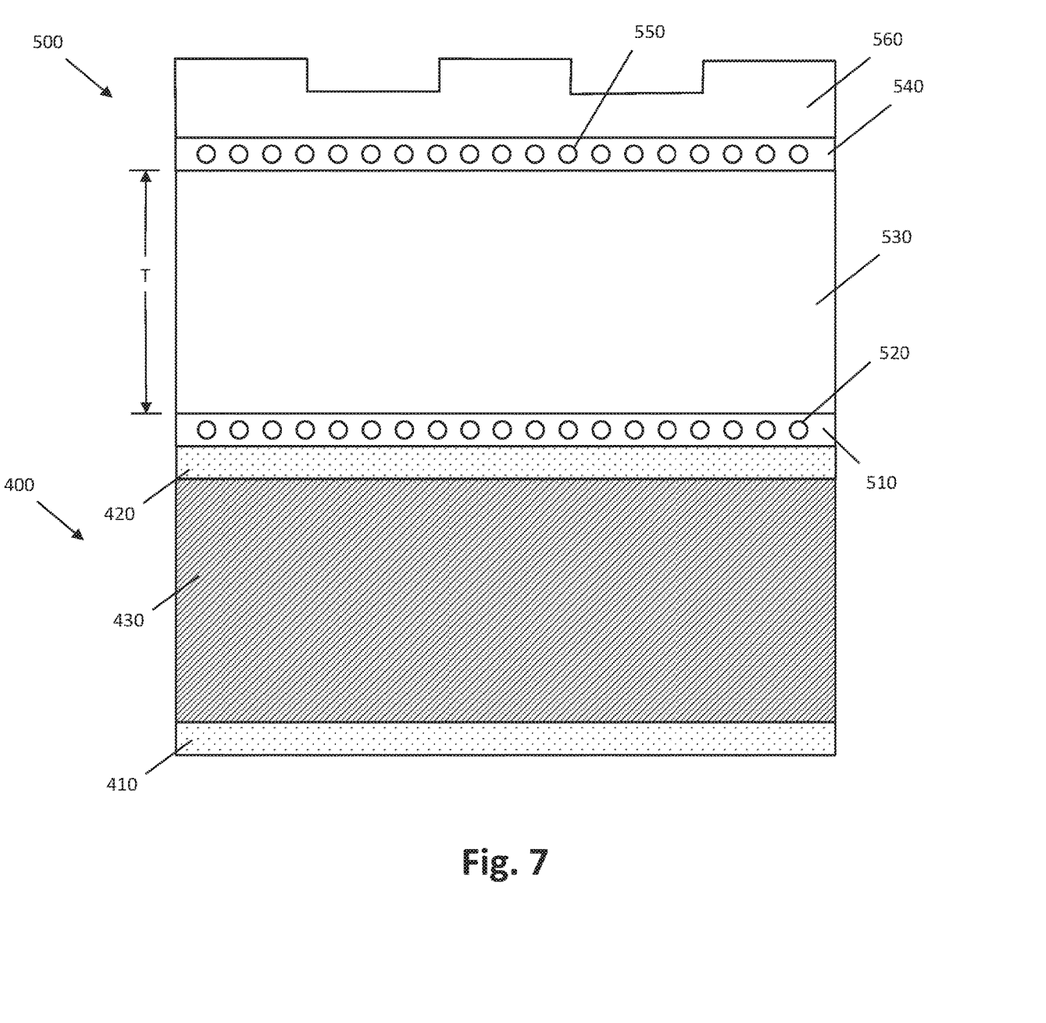
FIG. 7 is a schematic drawing illustrating a partial cross-section of one embodiment of a non-pneumatic tire.

FIG. 7 is a schematic drawing illustrating a partial cross-section of one embodiment of a non-pneumatic tire 500. In this embodiment, the non-pneumatic tire 500 includes the tire structure 400 of FIG. 6, including the inner ring 410, the outer ring 420, and the support structure 430. It should be understood, however, that any tire structure may be employed.

A reinforced hoop 510 having the same width as the outer ring 420 is disposed about the outer ring 420 in one of the manners described above. The reinforced hoop is constructed of one of the materials described above and includes reinforcement cords 520.

A circumferential tread includes a first elastomeric layer 530 disposed about the reinforced hoop 510. The first elastomeric layer may be rubber or any other suitable elastomeric material. A tread reinforcement layer 540 having reinforcement cords 550 is disposed above the first elastomeric layer 530. Exemplary materials for reinforcement cords 550 include, without limitation, polyester, nylon, aramid, glass, steel, and other metal. Where the reinforcement cords 550 are steel, the reinforcement layer 540 may be referred to as a steel belt. In the illustrated embodiment, the reinforcement layer 540 is a single layer of steel belts. In alternative embodiments, multiple layers of steel belts may be employed. The reinforcement cords 550 in the tread reinforcement layer 540 may be constructed of the same material as the reinforcement cords 520 in the reinforced hoop 510, or they may be constructed of different materials. The reinforcement cords 550 in the tread reinforcement layer 540 may extend in a circumferential direction, or in a non-circumferential direction, such as at an acute angle with respect to the circumferential direction.

In the illustrated embodiment, the tread reinforcement layer 540 includes a skim material that embeds the reinforcement cords. The skim material may be the same as the first elastomeric layer 530, or it may be a different material. For example, the skim material may be the same material as the reinforced hoop 510.

The tread reinforcement layer 540 is spaced from the bottom surface of the circumferential tread (and thus spaced from the reinforced hoop 510) by the thickness T of the first elastomeric layer 530. In one embodiment, the first elastomeric layer 530 has a thickness T of at least 0.5 inches (1.3 cm). In alternative embodiments the first elastomeric layer has a thickness between 0.050 inches (0.13 cm) and 6.5 inches (16.5 cm).

A second elastomeric layer 560 is disposed above the tread reinforcement layer 540. In one embodiment, the second elastomeric layer 560 is constructed of the same material as the first elastomeric layer 530. In an alternative embodiment, the first and second elastomeric layers 530, 540 are constructed of different materials. The second elastomeric layer 560 has tread elements formed therein. Exemplary tread elements include, without limitation, grooves, sipes, ribs, blocks, lugs, and other recesses and projections. In an alternative embodiment (not shown), the second elastomeric layer does not include any tread elements.

In one embodiment, a circumferential tread with the first elastomeric layer 530, the tread reinforcement layer 540 and the second elastomeric layer 560 is pre-formed. The circumferential tread is then attached to the reinforced hoop 510 with an adhesive, by welding or brazing, or by a chemical bond, such as by heating the components to create a bond.

In an alternative embodiment, the circumferential tread may be built layer by layer onto the reinforced hoop 510. The building process would include placing the first elastomeric layer 530 about the reinforced hoop 510, placing the tread reinforcement layer 540 about the first elastomeric layer 530, and placing the second elastomeric layer 560 about the tread reinforcement layer 540. In one embodiment, the layers are attached to each other at each step, such as with an adhesive, by welding or brazing, or by a chemical bond, such as by heating the components to create a bond. In an alternative embodiment, the tire is heated after all of the layers are assembled, such that the layers bond to each other.

The reinforced hoop 510, first elastomeric layer 530, and tread reinforcement layer 540 together form a shear element or shear structure having an elastic region disposed between upper and lower inelastic regions. The shear element may help the non-pneumatic tire 500 carry a greater load.

Figure 8:
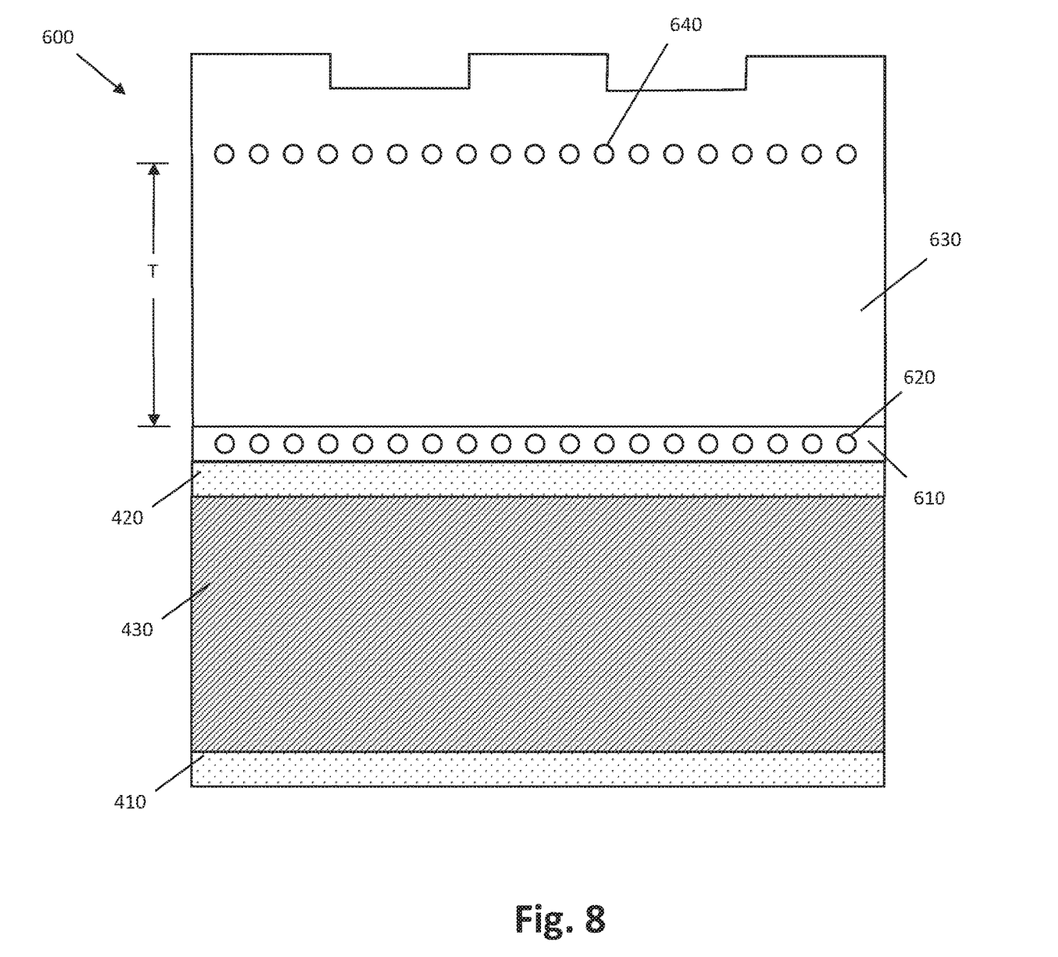
FIG. 8 is a schematic drawing illustrating a partial cross-section of an alternative embodiment of a non-pneumatic tire.

FIG. 8 is a schematic drawing illustrating a partial cross-section of an alternative embodiment of a non-pneumatic tire 600. In this embodiment, the non-pneumatic tire 600 also includes the tire structure 400 of FIG. 6, including the inner ring 410, the outer ring 420, and the support structure 430. It should be understood, however, that any tire structure may be employed.

A reinforced hoop 610 having the same width as the outer ring 420 is disposed about the outer ring 420 in one of the manners described above. The reinforced hoop is constructed of one of the materials described above and includes reinforcement cords 620.

A circumferential tread 630 is disposed about the reinforced hoop 610. The circumferential tread 630 includes a tread reinforcement layer defined by reinforcement cords 640 embedded therein. The reinforcement cords 640 may be the same as the reinforcement cords 550 described above with respect to FIG. 7, including any alternative embodiments discussed above.

The reinforcement cords 640 are spaced from the bottom surface of the circumferential tread (and thus spaced from the reinforced hoop 510) by the thickness T of the tread material below the reinforcement cords. This thickness may be the same as the thicknesses of the first elastomeric layer 530 described above.

The reinforced hoop 610, the reinforcement cords 640, and the tread material therebetween form a shear element or shear structure having an elastic region disposed between upper and lower inelastic regions. The shear element may help the non-pneumatic tire 500 carry a great load.

Figure 9:
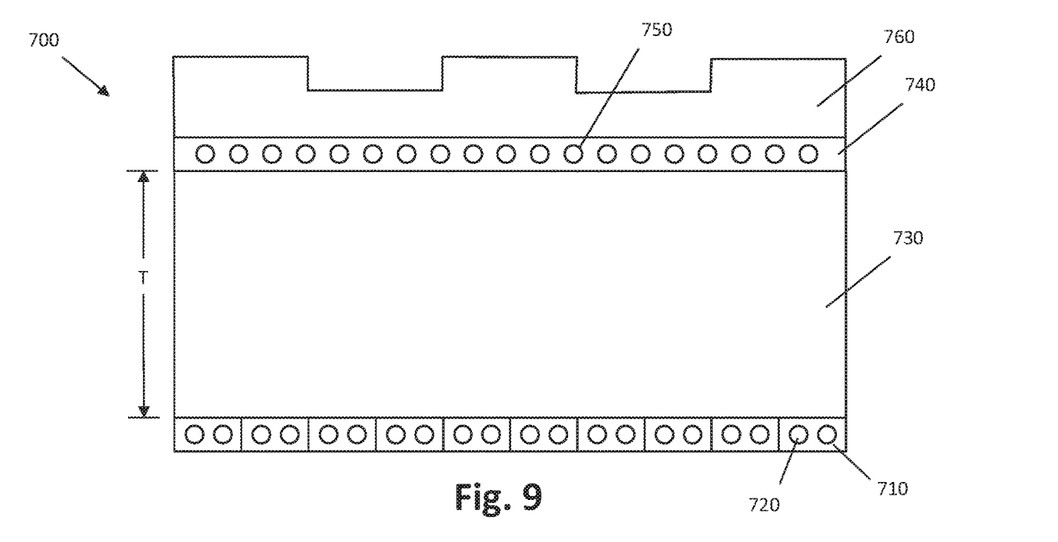
FIG. 9 is a schematic drawing illustrating an alternative embodiment of a shear element formed by a reinforced spiral ribbon and a circumferential tread.

The shear element may be formed in other ways. For example, FIG. 9 is a schematic drawing illustrating an alternative embodiment of a shear element formed by a spiral-wrapped ribbon 710 having reinforcement cords 720, a first elastomeric layer 730, and a tread reinforcement layer 740 having reinforcement cords 750. A second elastomeric layer 760 is disposed above the tread reinforcement layer 740. The FIG. 9 embodiment is substantially the same as the FIG. 7 embodiment, with the exception of the spiral-wrapped ribbon. The alternative embodiments discussed with respect to FIG. 7 should thus be understood to also apply to FIG. 9.

Figure 10:
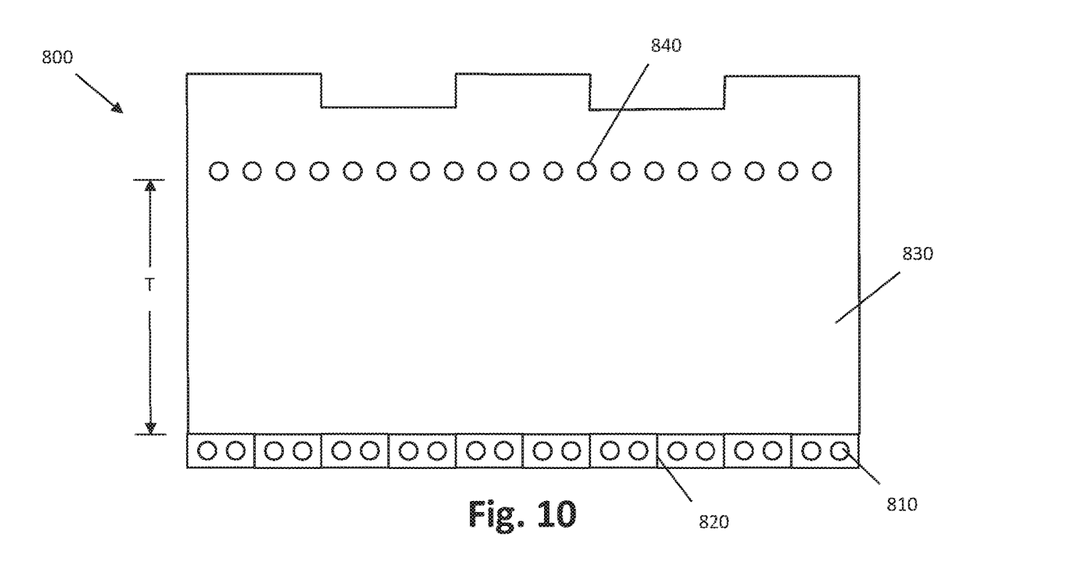
FIG. 10 is a schematic drawing illustrating another alternative embodiment of a shear element formed by a reinforced spiral ribbon and a circumferential tread.

FIG. 10 is a schematic drawing illustrating another alternative embodiment of a shear element formed by a spiral-wrapped ribbon 810 having reinforcement cords 820 and a circumferential tread 830 having a tread reinforcement layer 740 embedded therein. The FIG. 10 embodiment is substantially the same as the FIG. 8 embodiment, with the exception of the spiral-wrapped ribbon. The alternative embodiments discussed with respect to FIG. 8 should thus be understood to also apply to FIG. 10.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d.* Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
   an inner ring having an axis of rotation having a circumferentially continuous inner surface;
   an outer ring having a circumferentially continuous outer surface;
   a thermoplastic sheet having a first plurality of reinforcement cords embedded therein, the thermoplastic sheet being attached directly to the circumferentially continuous outer surface of the outer ring;
   support structure extending from the inner ring to the outer ring; and
   a circumferential tread extending about the thermoplastic sheet, the circumferential tread including a tread reinforcement layer embedded therein, the tread reinforcement layer being spaced from a bottom of the circumferential tread.

2. The non-pneumatic tire of claim 1, wherein the inner ring and the support structure are constructed of a first material.

3. The non-pneumatic tire of claim 1, wherein the tread reinforcement layer includes a second plurality of reinforcement cords that are constructed of a same material as the first plurality of reinforcement cords.

4. The non-pneumatic tire of claim 1, wherein the circumferential tread includes a lower elastomeric layer with a thickness of at least 0.5 inches (1.3 cm) disposed below the tread reinforcement layer, and an upper elastomeric layer disposed above the tread reinforcement layer.

5. The non-pneumatic tire of claim 1, wherein the tread reinforcement layer is a single layer of steel belts.

6. The non-pneumatic tire of claim 5, wherein the steel belts extend in a non-circumferential direction.

7. The non-pneumatic tire of claim 1, wherein the support structure is a webbing.

8. A method of making a non-pneumatic tire, the method comprising:
   providing a tire structure including an inner ring, an outer ring, and a plurality of support structures extending between the inner ring and the outer ring,
   wherein the inner ring includes a circumferentially continuous inner surface, and
   wherein the outer ring includes a circumferentially continuous outer surface;
   providing a thermoplastic sheet having a first plurality of reinforcement cords embedded therein;
   attaching the thermoplastic sheet directly to the circumferentially continuous outer surface of the outer ring of the tire structure;
   forming a circumferential tread having a reinforcement layer embedded therein, the reinforcement layer being spaced from a bottom surface; and
   attaching the circumferential tread to the thermoplastic sheet.

9. The method of claim 8, wherein the providing of the thermoplastic sheet having reinforcement cords embedded therein includes coating a plurality of reinforcement cords with a thermoplastic material through one of a pultrusion process and an extrusion process.

10. The method of claim 8, wherein the thermoplastic sheet is an elongated thermoplastic ribbon, and wherein the attaching of the thermoplastic sheet to the circumferentially continuous outer surface of the outer ring of the tire structure includes spirally winding the elongated thermoplastic ribbon about the circumferentially continuous outer surface of the outer ring of the tire structure.

11. The method of claim 8, wherein the attaching of the thermoplastic sheet to the circumferentially continuous outer surface of the outer ring of the tire structure includes forming a hoop and joining a first end of the thermoplastic sheet to a second end of the thermoplastic sheet.

12. The method of claim 11, wherein the attaching of the thermoplastic sheet to the circumferentially continuous outer surface of the outer ring of the tire structure further includes spin welding the hoop to the circumferentially continuous outer surface of the outer ring.

13. The method of claim 8, wherein the forming of the circumferential tread and the attaching of the circumferential tread to the thermoplastic sheet includes placing a first elastomeric layer about the thermoplastic sheet, placing the reinforcement layer about the first elastomeric layer, and placing a second elastomeric layer about the reinforcement layer.

14. The method of claim 8, wherein the reinforcement layer includes a second plurality of reinforcement cords.

15. The method of claim 14, wherein the first plurality of reinforcement cords are made of a same material as the second plurality of reinforcement cords.

16. The method of claim 8, wherein the circumferential tread includes a lower elastomeric layer with a thickness of at least 0.5 inches (1.3 cm) disposed below the reinforcement layer, and an upper elastomeric layer disposed above the reinforcement layer.

17. The method of claim 8, wherein the reinforcement layer is a single layer of steel belts.

18. The method of claim 8, wherein the plurality of support structures form a webbing.

19. The method of claim 8, further comprising mounting the inner ring onto a rim.

20. A method of making a non-pneumatic tire, the method comprising:
   providing a tire structure including an inner ring, an outer ring, and a plurality of support structures extending between the inner ring and the outer ring,
   wherein the inner ring includes a circumferentially continuous inner surface, and
   wherein the outer ring includes a circumferentially continuous outer surface;

providing a thermoplastic sheet having a first plurality of reinforcement cords embedded therein;

attaching the thermoplastic sheet to the circumferentially continuous outer surface of the outer ring of the tire structure;

forming a circumferential tread having a reinforcement layer embedded therein, the reinforcement layer being spaced from a bottom surface; and attaching the circumferential tread to the thermoplastic sheet after the attaching of the thermoplastic sheet to the circumferentially continuous outer surface of the outer ring of the tire structure.

\* \* \* \* \*